United States Patent
Girard et al.

(10) Patent No.: US 7,736,454 B2
(45) Date of Patent: Jun. 15, 2010

(54) METHOD FOR INCORPORATING AN ANNULAR ANTENNA AND ELECTRONICS INTO A TIRE

(75) Inventors: Jean-Claude Lucien Girard, Copley, OH (US); James Michael Hart, Akron, OH (US); William Allen Rex, Doylestown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 598 days.

(21) Appl. No.: 11/821,242

(22) Filed: Jun. 22, 2007

(65) Prior Publication Data

US 2007/0246151 A1    Oct. 25, 2007

Related U.S. Application Data

(63) Continuation-in-part of application No. 10/777,366, filed on Feb. 12, 2004, now abandoned.

(51) Int. Cl.
*B29D 30/12* (2006.01)
*B29D 30/24* (2006.01)
*B29D 30/26* (2006.01)
*B60C 23/00* (2006.01)

(52) U.S. Cl. ............... 156/110.1; 156/394.1; 156/414; 156/416; 152/152.1

(58) Field of Classification Search ............... 152/152.1, 152/152, 110.1, 115, 394.1, 395, 398, 407, 152/414, 416; 156/417, 121, 123
See application file for complete search history.

(56) References Cited

U.S. PATENT DOCUMENTS

| | | | |
|---|---|---|---|
| 1,670,444 A * | 5/1928 | Grammeter et al. | 156/123 |
| 3,662,335 A | 5/1972 | Fritze | 340/58 |
| 4,277,295 A * | 7/1981 | Schmidt et al. | 156/117 |
| 4,286,942 A * | 9/1981 | Fuzioka et al. | 425/577 |
| 4,305,446 A * | 12/1981 | Brown et al. | 152/452 |
| 5,479,171 A | 12/1995 | Schuermann | 342/44 |
| 7,128,116 B2 | 10/2006 | Mayet | 156/397 |
| 2002/0190853 A1 | 12/2002 | Nigon et al. | 340/448 |

FOREIGN PATENT DOCUMENTS

EP          634266       *   1/1995

* cited by examiner

*Primary Examiner*—Justin Fischer
(74) *Attorney, Agent, or Firm*—Richard B. O'Planick

(57) ABSTRACT

Apparatus and a method for pre-cure application of an antenna assembly to a tire comprises the method steps: forming within a rigid core defining an interior surface of the tire a core recess complementarily configured to the antenna assembly; positioning the antenna assembly within the core recess; building an uncured carcass of the tire around the rigid core entrapping the antenna assembly within the core recess; cross-bonding the antenna assembly to the inner surface of the tire during a cure cycle; and removing the cured tire and assembly from the rigid core.

5 Claims, 3 Drawing Sheets

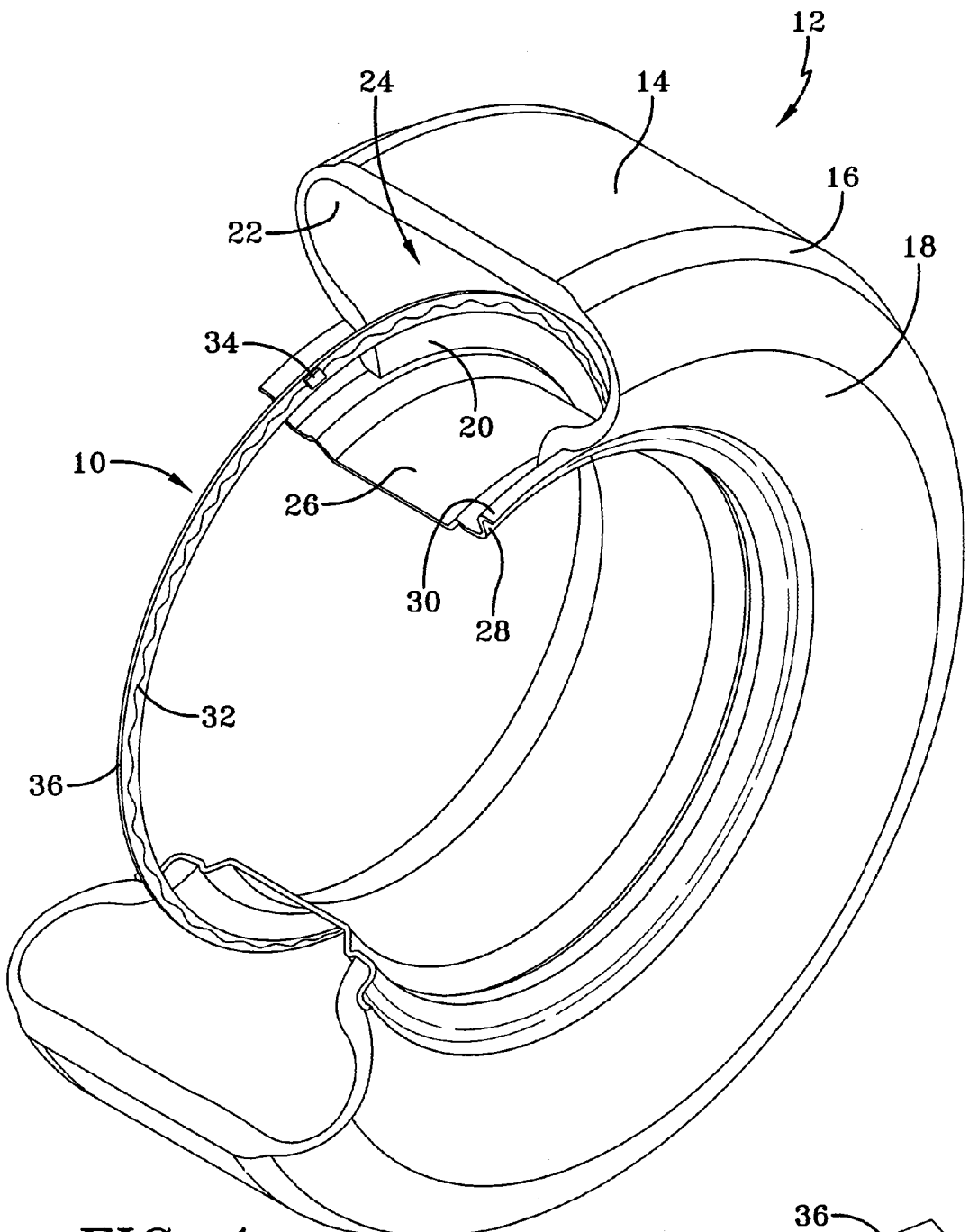
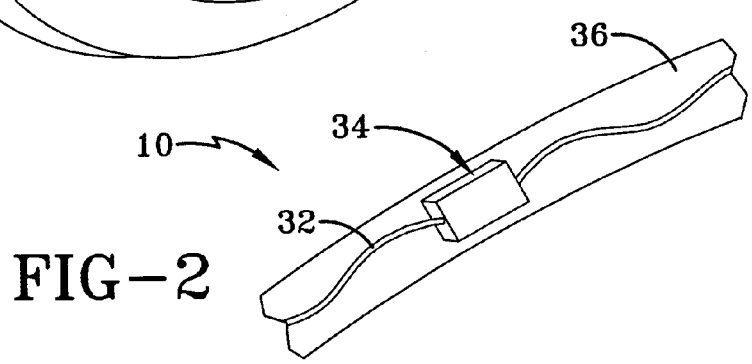
FIG-1
FIG-2

METHOD FOR INCORPORATING AN ANNULAR ANTENNA AND ELECTRONICS INTO A TIRE

This application is a continuation-in-part of and claims priority to Ser. No. 10/777,366, filed Feb. 12, 2004 now abandoned, which is fully incorporated herein by reference.

FIELD OF THE INVENTION

The subject invention relates generally to build apparatus and method for applying electronics to a tire for the purpose of monitoring tire condition parameters and, more specifically, to a tire build apparatus and method for incorporating an annular antenna and associated electronics into a tire.

BACKGROUND OF THE INVENTION

It is common to employ annular apparatus, including an antenna, for electronically transmitting tire or wheel identification or other data at radio frequency. The apparatus includes a radio-frequency tag, or transponder, comprising an integrated circuit chip having data capacity at least sufficient to retain identification information for the tire or wheel. Other data, such as the inflation pressure of the tire or the temperature of the tire or wheel at the transponder location, can be transmitted by the transponder along with the identification data.

The annular antenna is tire-mounted and transmits, at radio frequencies, data from the transponder to a reader mounted on the wheel assembly. The antenna and transponder may be incorporated into a tire during "pre-cure" manufacture of the tire. The integrity of the connection between the tire and antenna is greatly enhanced by a pre-cure assembly procedure. In practice, however, it is very difficult to do this. Both radial ply and bias ply tires undergo a substantial diametric enlargement during the course of manufacture. Bias ply tires are expanded diametrically when inserted into a curing press, which typically has a bladder that forces the green tire into the toroidal shape of the mold enclosing it. Radial ply tires undergo diametric expansion during the tire building or shaping process and a further diametric expansion during the course of curing. An annular antenna and the electronic tag associated therewith built into the tire in a pre-cure process, therefore, must endure significant stresses that can result in component failure. The electronic tag and the connection between the tag and the antenna, in particular, is vulnerable to damage from the forces imposed from pre-cure assembly to tire.

To avoid damaging the electronic tag or the connection between the tag and the annular antenna during the curing procedure, an alternative known approach is to assemble the tag and antenna into a separate annular apparatus for post-cure attachment to the tire. The annular apparatus may be attached to the tire after the tire is cured by adhesive or other known techniques. While such an approach avoids damaging the tag electronics during tire manufacture, adhesive attachment of the antenna and tag to a tire in a post-cure procedure has certain drawbacks. First, the procedure adds labor, and hence cost, to the manufacturing process. Secondly, the security of the attachment between the annular apparatus and the tire is dependent upon the efficacy of the adhesive system employed. Development of a suitable adhesive that is inexpensive, convenient to use, and durable enough to function throughout the life cycle of a tire has proven problematic.

Accordingly, a need remains for a system and method of applying tag electronics to a tire that is convenient, cost effective, and reliable. Such a procedure should further ensure the functional safety of the electronics and result in a positive electrical connection between the antenna and tag electronics. Finally, such a procedure ideally would incorporate the advantages, but avoid the shortcomings, of both the pre-cure and post-cure assembly alternatives discussed above.

SUMMARY OF THE INVENTION

Pursuant to one aspect of the invention a method for pre-cure application of an annular antenna assembly to a tire comprises the steps: forming within a rigid core defining an interior surface of the tire a core recess complementarily configured to the annular antenna assembly; positioning the annular antenna assembly within the core recess; building an uncured carcass of the tire around the rigid core entrapping the annular antenna assembly within the core recess; cross-bonding the annular antenna assembly to the inner surface of the tire during a cure cycle; and removing the cured tire and annular assembly from the rigid core.

According to another aspect of the invention, the annular antenna assembly may alternatively be assembled on the rigid core from components or pre-assembled off-site and transferred as a unitary assembly to the rigid core. In connection with the invention a tire mold is provided including a rigid core for the practice of the inventive method. A tire manufactured pursuant to the inventive method constitutes yet a further aspect of the invention.

BRIEF DESCRIPTION OF THE DRAWINGS

The invention will be described by way of example and with reference to the accompanying drawings in which:

FIG. 1 is a perspective view of a tire having an annular antenna assembly incorporated therein, a portion of the tire being removed for the purpose of illustration.

FIG. 2 is a fragmentary top plan view of a section of the annular antenna ring and transponder component.

DETAILED DESCRIPTION OF THE PREFERRED EMBODIMENTS

Figure 3:
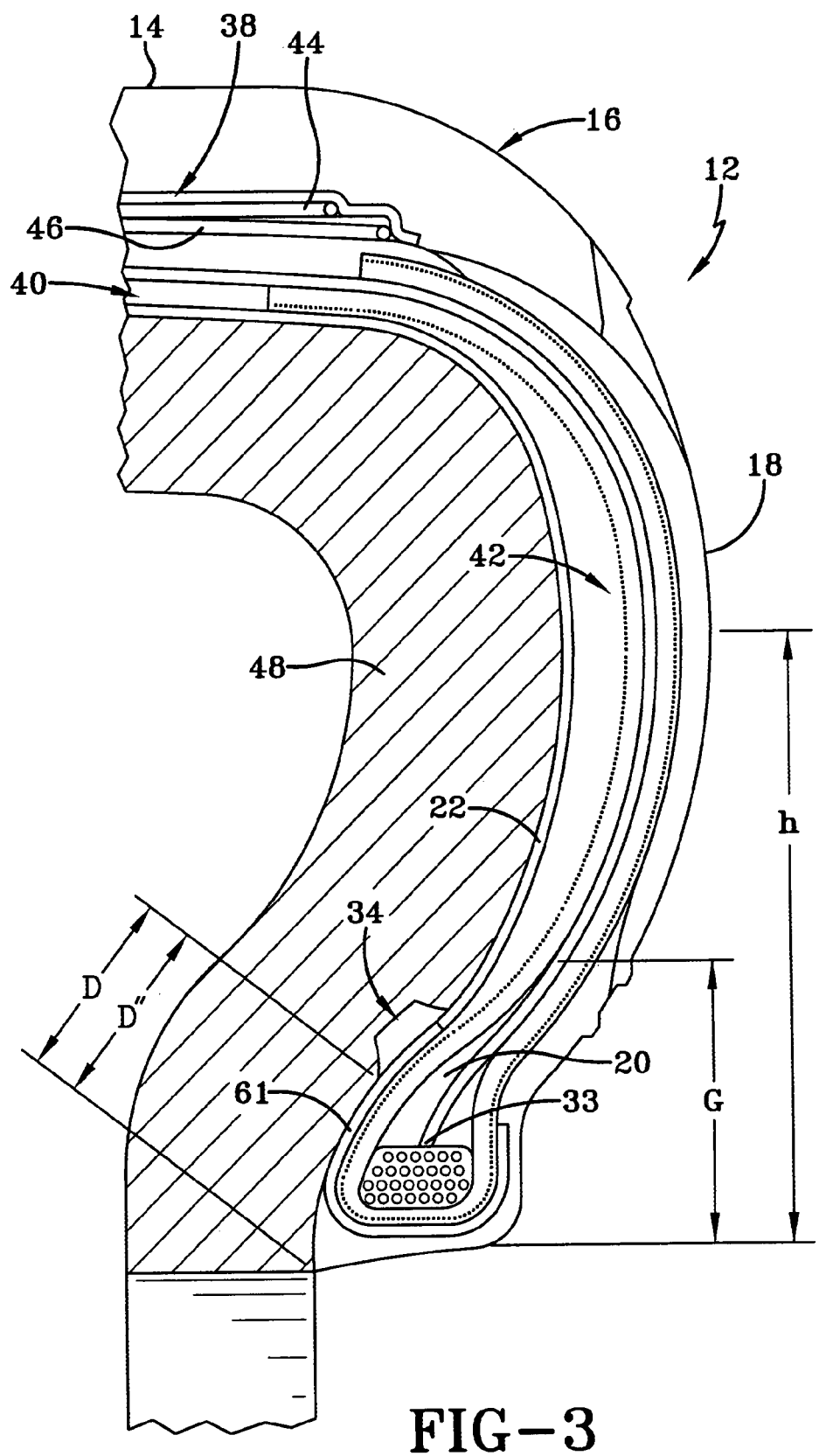
FIG. 3 is a partial transverse section view of a representative tire surrounding a rigid mold core and annular antenna assembly.

Referring initially to FIGS. 1 and 2, an annular antenna assembly 10 is shown deployed within a tire 12. The tire 12 is formed from conventional materials such as rubber or rubber composites by conventional means and may comprise a radial ply or bias ply configuration. A typical tire 12 is configured having a tread 14, a shoulder 16, an annular sidewall 18, and a terminal bead 20. An inner liner 22 is formed and defines a tire cavity 24. The tire 12 is intended for mounted location upon an annular rim 26 having a peripheral rim flange 28 and an outer rim flange surface 30. Rim 26 is conventionally configured and composed of a suitably strong metal such as steel.

An annular antenna 32 is provided and, in the preferred embodiment, embodies a sinusoidal configuration. Antenna 32 may be alternatively configured into alternative patterns or comprise a straight wire(s) if desired and may be filament wire, or cord or stranded wire. Acceptable materials for the wire include steel, aluminum, copper or other electrically conducting wire. As mentioned previously, the wire diameter is not generally considered critical for operation as an antenna and multiple strands of fine wire is preferred. The curvilinear form of antenna 32 provides flexibility and minimizes the risk of breakage during manufacture and use of the tire.

With continued reference to FIGS. 1 and 2, a tag carrier 34 of the general type described above is provided and may include means for sensing tire parameters such as pressure and temperature. Included as part of the apparatus 10 is a carrier strip of material 36 formed into the annular configuration shown. Carrier strip 36 is formed of electrically insulating, preferably semi-rigid elastomeric material common to industry such as rubber or plastic. The strip 36 is formed to substantially encapsulate the antenna wire(s) 32 and at least a portion of the tag carrier 34. In the post manufacturing state shown in FIG. 1, therefore, the apparatus 10 comprises antenna 32, tag carrier 34, and carrier strip 36, in a unitary, generally circular, assembly. The diameter of the apparatus assembly 10 is a function of the size of the tire 12. The preferred location of the antenna assembly 10 on the tire is on the tire just above the rim flange 30. Such a location minimizes stress forces on the assembly from operation of the tire and minimizes interference to RF communication between the tag and an external reader (not shown) that might otherwise be caused by the metal rim. Other mounting locations of the antenna assembly 10 on the tire, however, may be employed if desired for specific tire applications.

In FIG. 3, the tire 12 is shown in greater detail. The subject invention may be utilized in tires of various construction and size. For example, the tire 12 may be a commonly available radial passenger or light truck tire. By way of example, without any intent to limit the invention thereto, one such tire is taught by U.S. Pat. No. 6,358,346, incorporated herein by reference. The tire 12 includes a carcass 40 having a tread region 14, a shoulder region 16, and a sidewall region 18 extending from the shoulder 16 to an annular bead 20. A ply structure 42 is generally provided within sidewall 18 and one or more belt plies 44, 46 are located at the tread region 14. The inner liner 22 represents the interior surface of the tire and extends continuously from the bead, along the sidewall region, and across the tread region.

Figure 4:
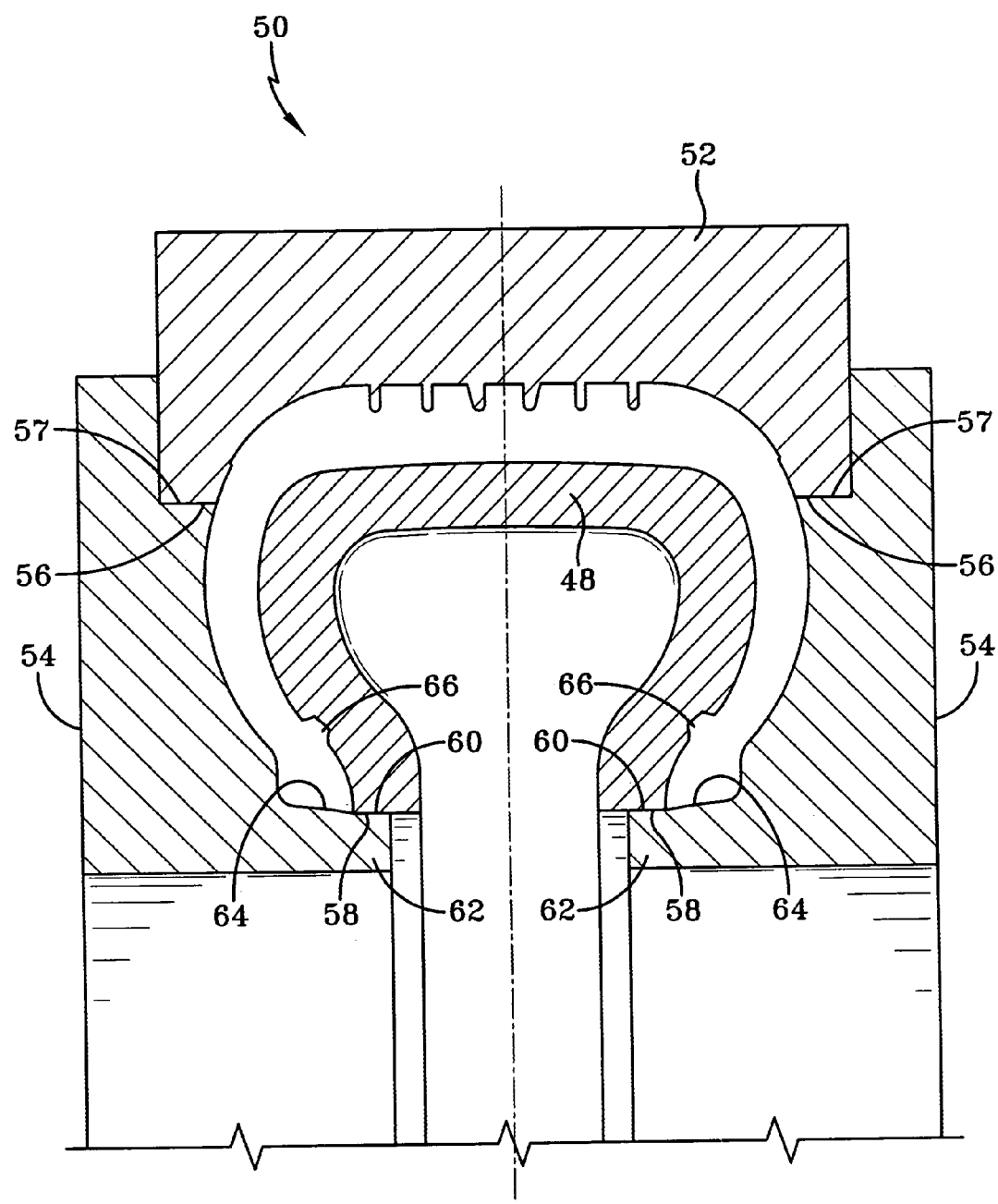
FIG. 4 is a schematic partial radial cross section of a mold having an annular antenna assembly incorporated therein pursuant to the invention.

It is known to manufacture a tire using a rigid core build process. Such a process is shown and described in U.S. Pat. No. 4,985,692, incorporated herein by reference. With reference to FIGS. 3 and 4, in a solid core build process the tire is built upon a rigid core 48. By "rigid", it should be understood as "substantially non-deformable" in contrast with elastic and deformable tire building techniques. A material suitable in the formation of the rigid core 48 is steel but other suitably rigid materials may be used as desired. Additionally, while common rigid core build techniques, such as those set forth in U.S. Pat. No. 4,895,692 utilize a plurality of sliding segments in order to close the mold, the invention is not limited thereto. The invention may be used in other types of rigid cores that close in differing ways or comprise a unitary, non-segmented structure if desired.

A segmented rigid core mold 50 is shown in FIG. 4 by way of example, it being understood that the invention need not be limited to the mold configuration shown. The mold 50 includes segments 52 that come into concordance with the side parts 54 via contact surfaces 56, 57. Each segment also has transverse contact surfaces (not shown) which in closed position adjoin the transverse faces of the adjacent segments. The radially inner faces 58 of the core 48 come, in closed position, into contact with the corresponding faces 60 arranged in the extension 62 of each side part 54 beyond a zone 64 assuring the molding of the radially inner surface of the beads of the tire. A cavity 65 is defined between the core 48 and mold segments 52, 54 defined along inward toroidal surfaces to create the structure of the tire to be molded.

Pursuant to the invention, it is intended that the antenna assembly 10 be incorporated and bonded to a tire 12 during the cure cycle. In order to facilitate this objective, an annular groove or recess 66 is formed within an outward surface of the mold core 48. The rigid composition of the core 48 facilitates the creation of an annular recess therein by machining or other known manufacturing techniques. The recess 66 is configured and dimensioned to receive antenna assembly 10 therein as shown in FIGS. 3, 4. The location of recess 66 within core 48 is generally preferred to be a distance nominally one inch above the tire bead, as indicated in FIG. 3. However, other locations may be used at the user's preference.

The recess 66 is provided with an enlarged socket 68 formed therein configured complementary with the transponder component 34 of the assembly. Any other geometric irregularity that is present within the assembly may be accommodated by the inclusion of a complementary recess or socket within the recess 66. The recess 66 preferably extends in a circular path about the core 48, however, a non-circular or irregular path may also be employed. The annular recess is sized in a depth dimension to allow the annular assembly 10 to project from the recess 66 a distance beyond the outer surface of core 48 for a purpose explained below. Insertion of the annular assembly 10 within recess 66 core 48 is preferably effected as a step preliminary to the building of the tire carcass 40 upon the core. Insertion of the annular assembly 10 into recess 66 may be accomplished manually or through the use of robotics or other known assembly methods.

Once the annular apparatus 10 is inserted into the recess 66 of core 48, the tire carcass may be built upon the core beginning with the inner liner 22 in conventional fashion. The carcass this entraps and surrounds the annular apparatus within recess 66. It will be appreciated that the annular apparatus 10 may be assembled on the core 48 from components, that is the transponder 34, antenna wire(s) 32, and the cover 36. Alternatively, the assembly 10 may be assembled off-site and mounted to the core 48 as a unitary assembly. At the conclusion of the tire build procedure upon core 48, the tire is subjected to a curing cycle in conventional fashion.

As a result of the vulcanization of tire 12, the cover 36 of the assembly 10 is cross-bonded to the inner liner 22 and a strong mechanical connection is established therebetween. Protrusion of the assembly 10 from the recess 66 of core 48 enhances the cross-bonded connection between the cover 36 and the inner liner 22 and ensures that the connection is not compromised by the presence of air between the surfaces of cover 36 and inner liner 22. Upon completion of the cure cycle, the tire 12 is removed from the mold 50 and from core 48 and includes an accurately positioned annular assembly 10 encircling the inner liner 22. The transponder 34 is oriented within the recess 66 so that any sensor devices may be directed inward in the finished tire. For example, a pressure sensor may be directed toward and protrude into the cavity 24 of tire 12 if desired.

From the foregoing it will be appreciated that the subject invention satisfies the needs of the industry for a convenient, cost-effective, and reliable method for affixing an annular antenna assembly to an inner surface of the tire. The location of the annular assembly is easily selected by the user and precisely positions the assembly 10 relative to the tire 12 in a carefully controlled and repeatable manner. Moreover, no additional adhesive or hardware is required to effect the connection between the assembly 10 and tire 12. Since the groove is configured to complement the annular assembly 10, a positive seating of the assembly 10 within the groove 66 is possible. Additional protrusions may be incorporated within assembly cover 36 if desired by which to orient assembly 10 within groove 66. The sides of the rigid core 48 defining groove 66 protect the annular assembly 10 during the vulcanization of the tire and damage to the assembly 10 from the forces within the tire during the cure cycle is avoided.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for pre-cure assembly of an annular antenna assembly and a tire comprising the steps:

forming within a rigid core defining an interior surface of the tire a core recess complementarily configured to the antenna assembly;

positioning the antenna assembly within the core recess;

building an uncured carcass of the tire around the rigid core entrapping the antenna assembly within the core recess;

cross-bonding the antenna assembly to the inner surface of the tire during a cure cycle;

separating the cured tire and antenna assembly from the rigid core.

2. A method according to claim 1 further comprising the step of sizing the antenna assembly to protrude a distance beyond an outward surface of the rigid core while positioned within the core recess.

3. A method according to claim 1 further comprising the step of assembling the antenna assembly on the rigid core.

4. A method according to claim 1 further comprising the step of pre-assembling the antenna assembly prior to positioning the antenna assembly within the core recess.

5. A method according to claim 1 further comprising the step of forming a socket within a portion of the core recess configured to receive a sensor housing component of the antenna assembly.

* * * * *